June 24, 1969  G. SCHAMING  3,451,298
POSITIVE GRIP SHEARING MEANS
Filed May 16, 1966

Inventor
Guillaume SCHAMING
By Wenderoth, Lind and Ponack
attorneys

United States Patent Office 3,451,298
Patented June 24, 1969

3,451,298
POSITIVE GRIP SHEARING MEANS
Guillaume Schaming, Le Perreux, France, assignor to Societe Anonyme Schostal, Vaduz, Liechtenstein
Filed May 16, 1966, Ser. No. 550,425
Claims priority, application France, May 22, 1965, 18,063
Int. Cl. B26d 1/00, 5/42, 7/02
U.S. Cl. 83—198                    8 Claims

ABSTRACT OF THE DISCLOSURE

Shearing tool which consists of a block carrying the bottom blade and having slidably mounted therein a slide carrying the top blade. A plate cooperating with the slide is supported in turn by spring means and has its stroke limited by columns. Lugs carried by and projecting from the plate along a relatively great height compress a tool slide prestressing spring means. Cam-responsive means are provided for clamping the metal bar during the shearing operation, and also means for ejecting the sheared bloom.

---

This invention relates to devices for shearing metal and has specific reference to a device of this character for shearing metal bars to any desired lengths.

Devices of this type as now constructed are not perfectly suitable for their purpose since they are ill-suited for delivering without deformation small-sized blooms as well as large sized blooms. It is the object of this invention to provide a shearing device free of the drawbacks characterising known devices.

The device of this invention is characterised in that it constitutes a unitary shearing tool adapted to be fitted under the press without being operatively connected to the slide thereof.

The shearing tool according to this invention consists of a block carrying the bottom blade and having slidably mounted therein a slide carrying the top blade; of a plate on which said slide is caused to bear, said plate being supported in turn by spring means and having its stroke limited by columns; of lugs carried by and projecting from said plate along a relatively great height to compress said tool slide prestressing spring means; of cam-responsive means for clamping the metal bar during the shearing operation, and of means for ejecting the sheared bloom.

According to an essential feature of this invention said means for clamping the bar during the shearing operation consist of a bar clamp comprising a set of compression coil springs compressed during the upward stroke of said slide and held in their compressed condition by vertical cams rigid with said plate.

According to a complementary feature of this invention, during the shearing operation the pressure required for the blade penetration before the bloom is detached from the bar is reduced to a minimum value due to the proper selection of the angle of inclination of the bar in relation to the blade movement, this angle providing a backing off of the surfaces to be sheared without any risk of tearing the metal.

According to this invention, this angle of inclination may vary from 7° to 12°.

According to this invention the shearing tool is designed with a view to minimize the power demand, as the shearing pressure is applied only during a relatively small portion of the slide stroke, which is just sufficient for detaching the bloom from the bar, the slide prestressing springs and the weight of said slide permitting of continuing the downward stroke in order to eject the sheared bloom which falls through the press bed or table.

According to another feature of this invention, the device comprises an ejector adapted upon completion of the slide stroke to strike an anvil-like member in order to feed the abutment member engaged by the bloom end opposite to the blades of the shearing device, said abutment separating the bloom clamped against the top blade.

According to a further feature characterising this invention, the aforesaid bar clamp is "cocked," before shearing a bar, by cocking latches actuated by a lateral cam driven from said vertical cams, said bar clamp remaining in its cocked position during the feeding of the bar to be sheared or the introduction of another bar.

According to this invention, the tool is capable of shearing very short blooms as well as relatively long blooms; in the first case the abutment member inclined to the same angle as the bar supports alone the bloom and in the second case the bloom is supported by its end support.

Other feature and advantages of the invention will appear as the following description proceeds with reference to the accompanying drawings illustrating diagrammatically by way of example a typical form of embodiment of the invention. In the drawings.

Figure 1:
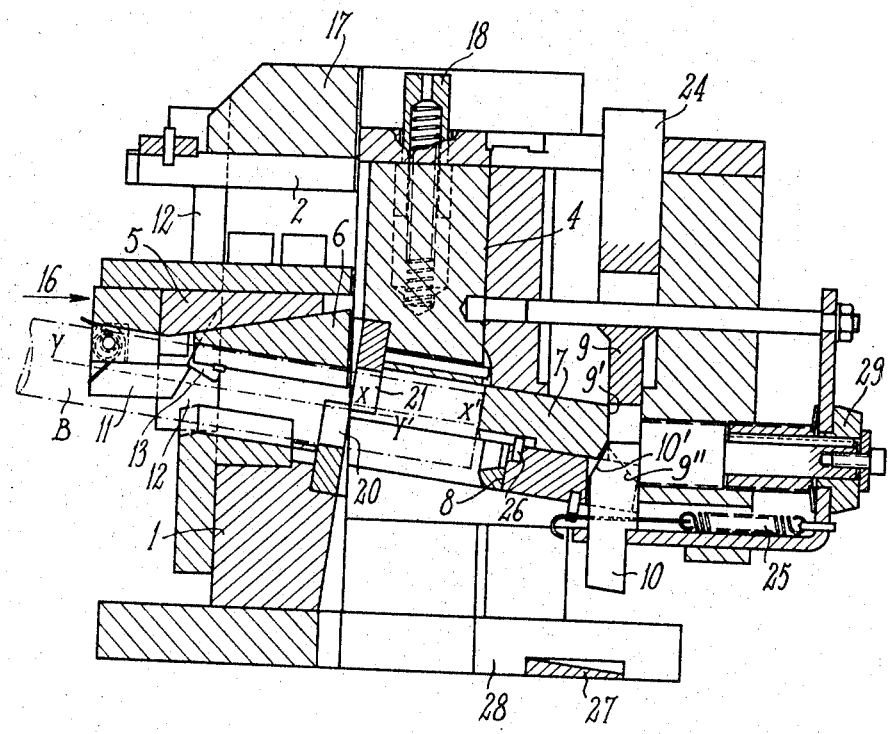
FIGURE 1 is a vertical sectional and elevational view of a shearing tool according to this invention, the tool being free, that is, before its engagement by the press drop slide.

The device constituting the subject-matter of the present invention consists of a unitary shearing tool adapted to be fitted under the press without being operatively connected to the drop slide thereof. The tool is based on the principle whereby to permit the introduction of the bar a certain play must be provided in the tool, this play being necessarily taken up, before the actual shearing operation, from the bar side as well as from the bloom side, and that the bloom must be released before the downward stroke of the tool slide is completed.

The shearing tool consists of a block 1 carrying the bottom blade 20. A tool slide 4 carrying the top blade 21 of the shearer is vertically movable in this block 1 and bears upon a plate 2, at its upper portion, through the medium of compression coil springs 3, its stroke being limited by four columns such as 22. Mounted on the plate 2 are lugs 17 projecting beyond the top of the plate 2 of slide 4. This slide 4 comprises spring-loaded push-members such as 18, the spring means of these push members providing the pre-stress applied to the slide 4.

Figure 2:
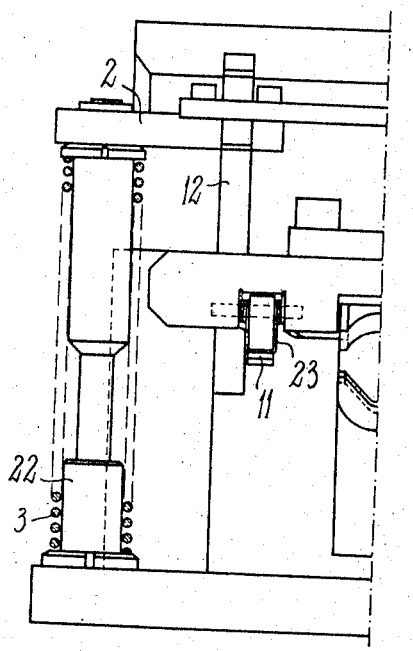
FIGURE 2 is a half elevational view of the device shown in FIGURE 1, as seen in the direction of the arrow 16 of FIGURE 1.
Figure 3:
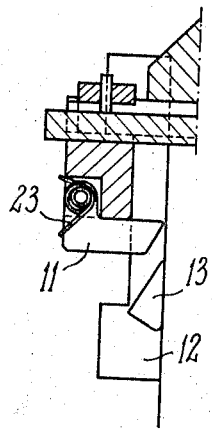
FIGURE 3 illustrates in fragmentary section a detail of the device for cocking the bar clamp.

A bar clamp consisting of a pair of co-acting wedges 5 and 6 is also provided, the upper wedge 5 being actuated by spring means (illustrated diagrammatically in the form of an arrow 16) during the upward stroke of the slide 4, these spring means being kept in their compressed condition by vertical cams 12 rigid with said plate 2. FIGURE 3 illustrates in detail one of the two bar-clamp cocking devices (both devices being disposed symmetrically). Each device (of which the operation will be described presently) comprises a cocking latch 11 responsive to a return spring 23, and a lateral cam 13 (see also FIGURE 2) driven by the vertical cam 12.

Conventional means are also provided for holding the bloom during the shearing operation.

These means mounted on the slide 4 comprise a cam 9 having a face 9' inclined to the vertical formed with an integral push member 24 and urged upwards by a spring (not shown), for moving an abutment member 7, this cam being adapted to actuate through its end face 9" a support for holding the bar end 8 normally urged backwards by a tension spring 25; a stud 26 rigid with said support 8 and movable in a groove of abutment member 7 permits likewise the return movement of this abutment member. Moreover, the assembly comprises a bloom ejector 10 formed with an inclined face 10' and actuated as a consequence of its engagement with the anvil-like member 27 at the end of the shearing operation, as will be explained presently.

The above described device operates as follows:

When the shearing tool is free (position shown in FIGURE 1) the slide 4 is at its top dead centre. The axis X–X' of the bloom receiving cavity is located a few millimeters above the axis Y–Y' of bar B in order to create a play permitting the introduction of the bar into the tool. This play is taken up before the shearing operation in order properly to hold the bar and the bloom. Therefore, it must be taken up on the bar side as well as on the bloom side.

The bar B is moved against the abutment member 7 (FIGURE 1) and the shearing tool is fitted beneath the press drop slide (not shown).

Figure 4:
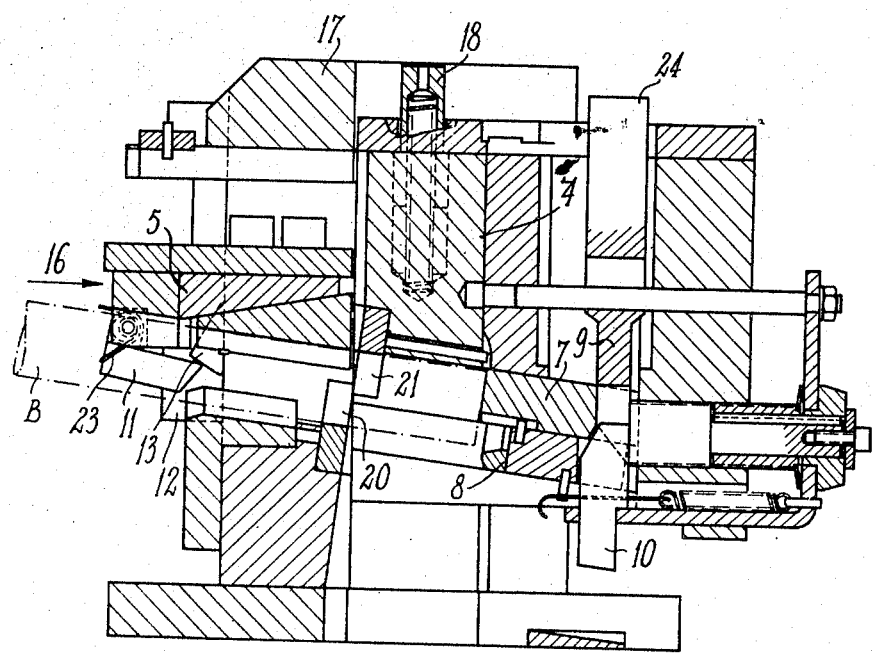
FIGURES 4 to 7 illustrate the shearing tool of this invention in its successive positions of operation.

During its downward stroke the press slide engages the lugs 17 of the tool. Thus, plate 2 is lowered (FIGURE 4) and carries along the tool slide 4 which bears on this plate 2. The top blade 21 of slide 4 engages the bar B; the plate 2 supporting the vertical cams 12 of the bar clamp continues its downward movement and actuates the bar clamp, whereby the cocking latches 11, under the control of cams 12, release the springs 16 which, by pushing the top wedge 5 backwards urge the bottom wedge 6 against the bar. Thus, the bar is clamped shortly after the press drop slide has commenced the depressing of the push members 18 provided for prestressing the tool slide 4.

Figure 5:
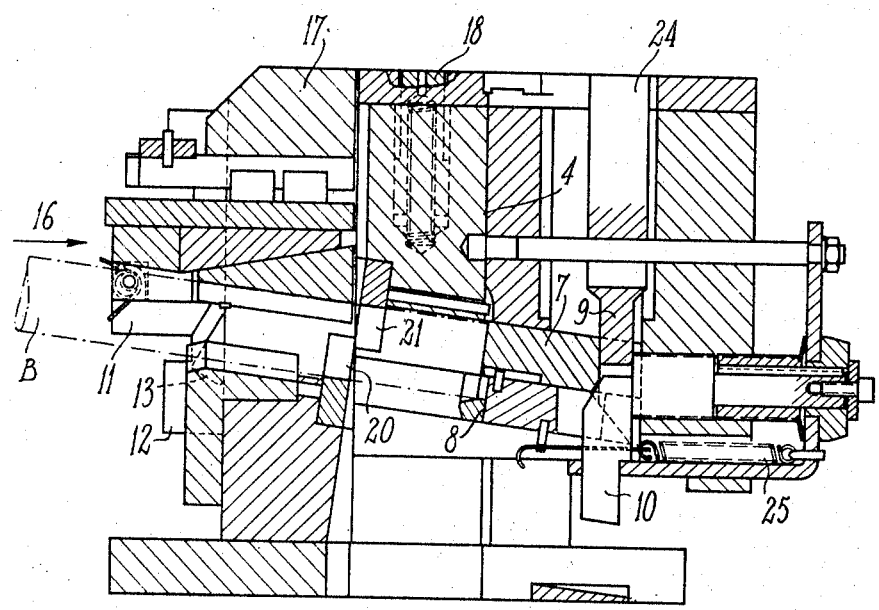

As the press slide continues its downward stroke it compresses home the push member 18 and pushes back the cam 9 which, through its inclined face 9' and its end 9'', causes the support 8 to be positioned under the bar B (FIGURE 5) and urges the abutment member 7 against this bar, thus taking up the play created between this abutment member and the bar end as a consequence of its inclination and also of its downward movement.

As it continues its downward movement the press slide engages the top of the tool slide 4. This corresponds to the end of the prestressing of slide 4, to the beginning of the penetration to the top blade 21 into the bar to be sheared and to the application of the positive shearing pressure.

Figure 6:
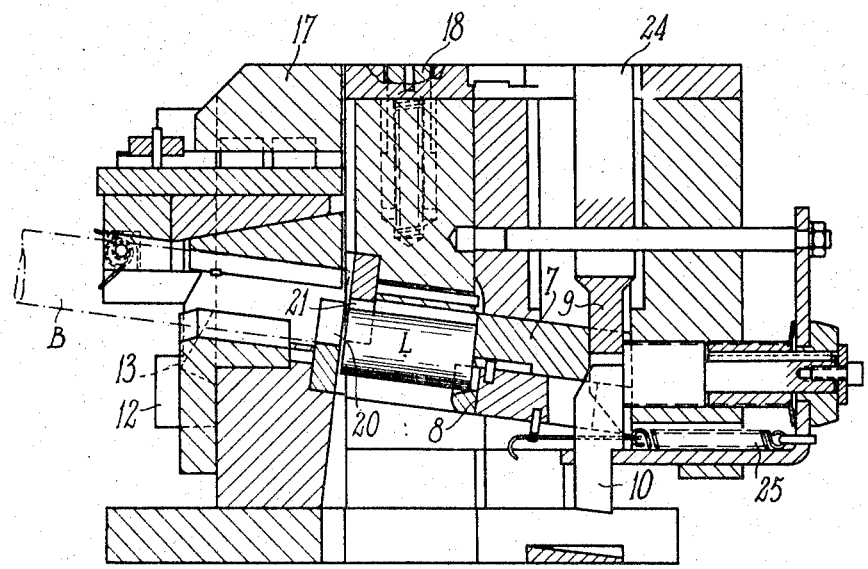

Now the shearing operation proper can take place (FIGURE 6). The amplitude of the penetration of the top and bottom blades into the bar varies as a function of the ductility of the material to be sheared (it is about ¼ to ⅙ of the bar diameter); at the end of the shearing operation, when the bloom is detached from the bar, the press slide must be slightly short of its bottom dead centre. This position is adjusted by means of the press slide adjustment screw.

Figure 7:
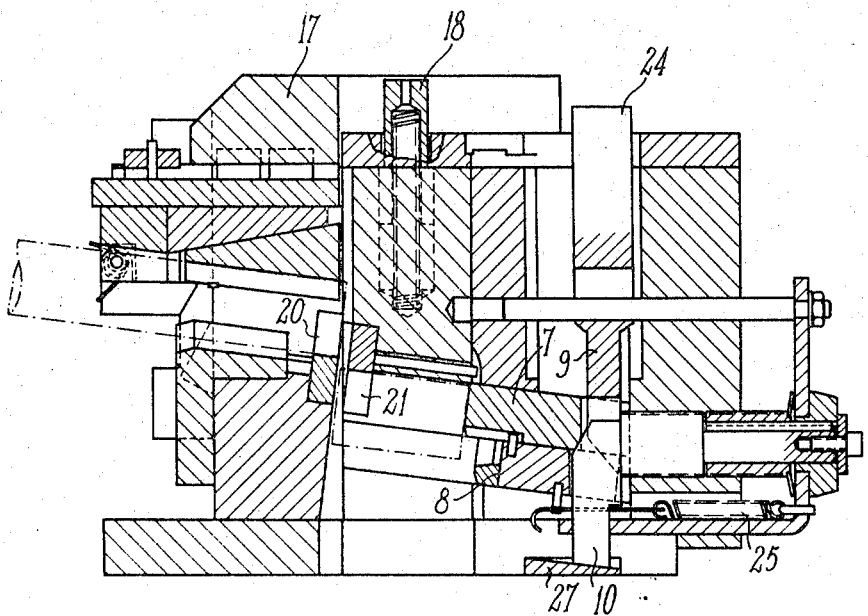

The press slide clears its bottom dead centre position but the tool slide 4 continues its downward stroke under the control of the springs of push-members 18 (FIGURE 7) and also by gravity and inertia. Thus, the bloom is detached from the bar.

The ejector 10 strikes the anvil-like member 27 and causes the abutment member 7 to move against the rear face of the bloom L so as to seperate the latter from the top blade 21.

In the shearing operation followed by the separation of the bloom from the bar, as the push-member 18 are expanded by their springs the upper portion of tool slide 4 moves away from the lower face of the press slide and the cam 9 can be returned to its upper initial position for example by spring means (not shown) mounted therein. As it moves upwards this cam 9 releases the bar end support 8 which recedes so as to free the bloom, the latter subsequently falling by gravity through the press table or bed 28 (FIGURE 1). During its backward movement the support 8 has carried along the abutment member 7 by means of its stud 26.

During the upward stroke of the tool slide the bar clamp must be re-cocked to permit the next shearing operation.

FIGURE 3 illustrates the bar clamp cocking device, the bar-clamp control cam being shown in its bottom dead centre position. Before the blade penetration the cocking latches 11 of the bar clamp assume their cocked position. During the upward stroke of the slide, the lateral cam 13 driven upwards by the vertical cams 12 resets the bar clamp.

Shortly before the end of the upward stroke, the cocking latches 11 leave the cam 13, the bar clamp remaining cocked since it remains in engagement with the aforesaid vertical cams 12.

At the end of the upward stroke of the tool slide the passage provided for the bar in slide 4 is cleared and the cycle may be resumed by introducing a fresh bar moving the abutment member 7 against the cam 9, and so forth.

The shearing pressure necessary for the blade penetration before the bloom is detached from the bar is reduced to a minimum value due to the inclination of the of the bar in relation to the blades which causes a backing off of the surfaces to be sheared, without tearing the metal.

Preferably, this bar inclination will be adjusted within the limits of about 7° to about 12°.

Moreover, a screw device 29 may be provided for adjusting the length of the blooms to be sheared, this device moving the bar 8 and the abutment member 7 in order to obtain the desired length.

It is clear that the shearing tool according to this invention is designed with a view to minimize power requirements, the actual shearing power being applied only to a relatively small fraction of the operating stroke which is just sufficient to separate the bloom from the bar. This stroke fraction during which the pressure is applied is of the order of ¼ to ⅙ of the diameter of the bar to be sheared. This stroke fraction is located at the end of the stroke of the tool provided with a prestress system. The prestress springs and the weight of the slide, as the latter continues its downward stroke, complete the separation and the ejection of the sheared bloom.

If the tool were not provided with said prestress system, this stroke fraction under high-pressure conditions would be located nearer to the middle of the stroke performed by the press slide, in a position whereat only one-half of the rated power of the press is available if the latter is designed for delivering this rated power 30° before the dead centre. Only one-third of the rated power of the press could be utilized if the latter were designed for delivering its rated power 20° before the dead centre.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A tool device for shearing metal bars into blooms of any desired lengths, consisting of a shearing unit adapted to be placed under a press without being operatively connected to the press slide, comprising a block supporting the bottom blade of the shearing tool and having slidably mounted therein a tool slide supporting the top blade co-acting in the conventional manner with said bottom blade; the top portion of said tool slide bearing upon a plate through compression coil springs, four columns adapted to limit the vertical stroke of said tool slide, a plurality of lugs projecting substantially beyond the top of said plate and engageable by said tool slide during its downward stroke, push-members having spring means adapted to provide a prestressing force applicable to said tool slide, cam-responsive means adapted to clamp the bar during the shearing operation, and means for ejecting the sheared blooms.

2. A tool device as set forth in claim 1, wherein said means for clamping the bar during the shearing operation consist of a bar clamp comprising a set of springs adapted to be compressed during the upward stroke of said tool slide and vertical cams solid with said plate for holding said last-named springs in their compressed condition.

3. A tool device as set forth in claim 1, wherein said means for clamping the bar during the shearing operation consist of a bar clamp comprising a set of springs adapted to be compressed during the upward stroke of said tool slide, vertical cams solid with said plate for holding said last-named springs in their compressed condition, means for holding said bloom to be sheared, which consist of a bloom support and of an abutment member, and a cam adapted to be actuated during the downward stroke of said tool slide for actuating said bloom support and said abutment member.

4. A tool device as set forth in claim 1, wherein said means for clamping the bar during the shearing operation consist of a bar clamp comprising a set of springs adapted to be compressed during the upward stroke of said tool slide, vertical cams solid with said plate for holding said last-named springs in their compressed condition, means for holding said bloom to be sheared, which consist of a bloom support and of an abutment member, and a cam adapted to be actuated during the downward stroke of said tool slide for actuating said bloom support and said abutment member, a relative inclination of about 7° to 12° being provided between the axis of said bar to be sheared and the perpendicular to the plane of the blade cutting motion, in order to produce a backing off of the surfaces to be sheared without tearing the metal.

5. A tool device as set forth in claim 3, comprising an ejector and an anvil-like member adapted to be engaged by said ejector member during the final fraction of the tool slide stroke so as to move said abutment member engaged by the bloom end opposite to the shearing blades forwards, whereby said abutment member can detach the bloom pressed against said top blade.

6. A tool device as set forth in claim 5, wherein cocking latches responsive to a lateral cam actuated by said vertical cam are provided for cocking said bar clamp before the actual bar shearing operation, said bar clamp remaining in its cocked condition for feeding the bar to be sheared and also for introducing a fresh bar.

7. A tool device as set forth in claim 6, wherein said abutment member is inclined to the same angle as said bar to be sheared and is adapted to support above the bloom in the case of relatively short blooms, an end support being provided to support the bloom in the case of relatively long blooms.

8. A tool device as set forth in claim 7, wherein screw means are provided for adjusting the bloom shearing length.

References Cited

UNITED STATES PATENTS

| 3,037,446 | 6/1962 | Thompson | 83—454 |
| 3,204,504 | 9/1965 | Bradlee | 83—387 |

WILLIAM S. LAWSON, *Primary Examiner.*

U.S. Cl. X.R.

83—387, 459